(12) United States Patent
Lin et al.

(10) Patent No.: US 9,065,490 B2
(45) Date of Patent: Jun. 23, 2015

(54) SHORTWAVE COMMUNICATION DEVICE

(71) Applicant: TENNRICH INTERNATIONAL CORP., Taoyuan (TW)

(72) Inventors: Chin-Tien Lin, Taoyuan (TW); Shih-Hui Chen, Taoyuan (TW); Chia-Sheng Liao, Taoyuan (TW); Qun Liu, Taoyuan (TW)

(73) Assignee: TENNRICH INTERNATIONAL CORP., Taoyuan Hsieh (TW)

( * ) Notice: Subject to any disclaimer, the term of this patent is extended or adjusted under 35 U.S.C. 154(b) by 205 days.

(21) Appl. No.: 13/647,863

(22) Filed: Oct. 9, 2012

(65) Prior Publication Data

US 2014/0099895 A1 Apr. 10, 2014

(51) Int. Cl.
*H04B 5/00* (2006.01)

(52) U.S. Cl.
CPC ................... *H04B 5/0081* (2013.01)

(58) Field of Classification Search
CPC ..... H01Q 1/243; H01Q 1/521; H04B 5/0081; H04W 52/283; H04W 52/32; H04W 52/03
USPC ................... 455/41.1–41.3, 404.2
See application file for complete search history.

(56) References Cited

U.S. PATENT DOCUMENTS

| 8,086,269 | B2 * | 12/2011 | Wang | 455/558 |
| 2010/0069118 | A1 * | 3/2010 | Wang | 455/558 |
| 2010/0125510 | A1 * | 5/2010 | Smith et al. | 705/17 |
| 2011/0086609 | A1 * | 4/2011 | Buehler et al. | 455/404.2 |

* cited by examiner

*Primary Examiner* — Edward Urban
*Assistant Examiner* — Max Mathew

(57) ABSTRACT

A shortwave communication device includes first and second carriers, a processing unit, first and second transmission units and a flexible connecting portion, and the first and second transmission units are installed on the first and second carriers respectively, and the first transmission unit is coupled to the processing unit, and the flexible connecting portion is coupled between the first and second carriers, and the flexible connecting portion has a connected line for constituting an electric connection between the processing unit and the second transmission unit. With the flexible connecting portion, relative position of the first and second carriers can be changed freely to expand the transmission range and enhance the transmission effect.

9 Claims, 7 Drawing Sheets

SHORTWAVE COMMUNICATION DEVICE

FIELD OF THE INVENTION

The present invention relates to a shortwave communication device, in particular to the shortwave communication device capable of expanding the transmission range and enhancing the transmission effect.

BACKGROUND OF THE INVENTION

As science and technology advance, modern consumption pattern is changed. For convenience, plastic money has become increasingly more popular and used extensively in our daily life. For example, electronic purse is used extensively in public transportation electronic fee collection systems, and the electronic purse comes with a card structure and contains a non-contact sensor chip (such as a near-field communication chip) capable of registering the monetary value purchased by users. When use, the electronic purse is placed near a sensing area, and an electromagnetic induction effect produced by the sensing area will magnetically induce the non-contact sensor chip of the electronic purse and re-compile the data in the non-contact sensor chip such as increasing the monetary value (which is an operation of adding value), decreasing the monetary value (which is an operation of making a payment), or adding a remark for recording the number of transactions. Therefore, consumers no longer need to make payment by cash or credit card, so as to improve the convenience of consumption.

In general, users generally place the electronic purse with their personal belongings (such as a handbag) when using the electronic purse, and the handbag may contain many articles, particularly those made of metal or conductive materials (such as a mobile phone or a flat PC) which will shield the electronic purse easily. As a result, the transmission performance of the electronic purse may be affected adversely.

SUMMARY OF THE INVENTION

Therefore, it is a primary objective of the present invention to provide a shortwave communication device capable of expanding the transmission range and enhancing the transmission effect.

To achieve the foregoing objective, the present invention provides a shortwave communication device comprising: a first carrier, a second carrier, a processing unit, a first transmission unit, a second transmission unit and a flexible connecting portion, wherein the first and second transmission units are disposed on the first and second carriers respectively, and the first transmission unit is coupled to the processing unit, and the flexible connecting portion is coupled between the first and second carriers, and the flexible connecting portion has a connected line for constituting an electric connection between the processing unit and the second transmission unit.

With the flexible connecting portion, relative position of the first and second carriers can be changed freely to expand the transmission range and enhance the transmission effect.

DESCRIPTION OF THE PREFERRED EMBODIMENTS

The technical characteristics of the present invention will become apparent with the detailed description of the preferred embodiments accompanied with the illustration of related drawings as follows.

Figure 1:
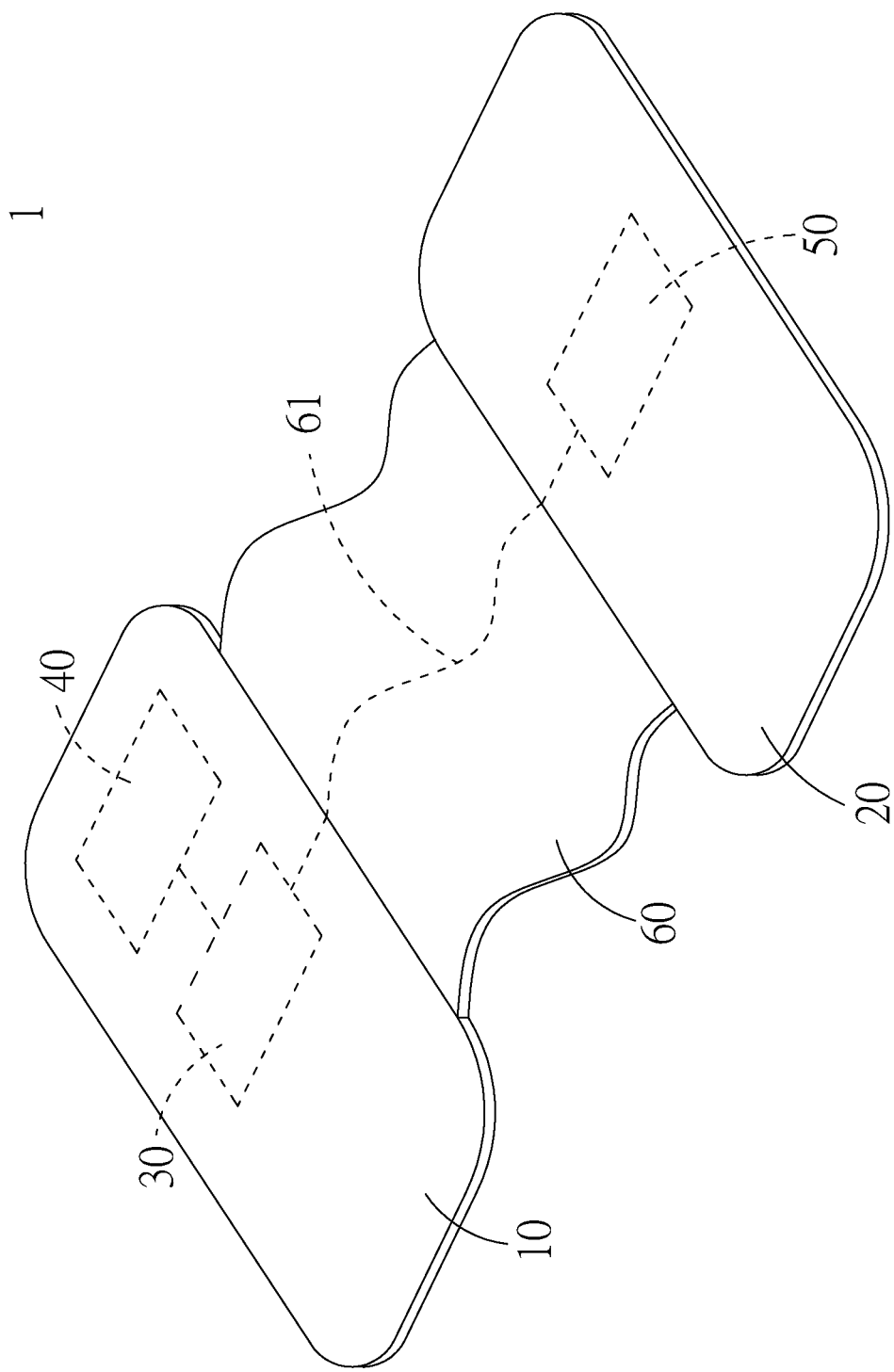
FIG. 1 is a perspective view of a shortwave communication device of the present invention.
Figure 2:
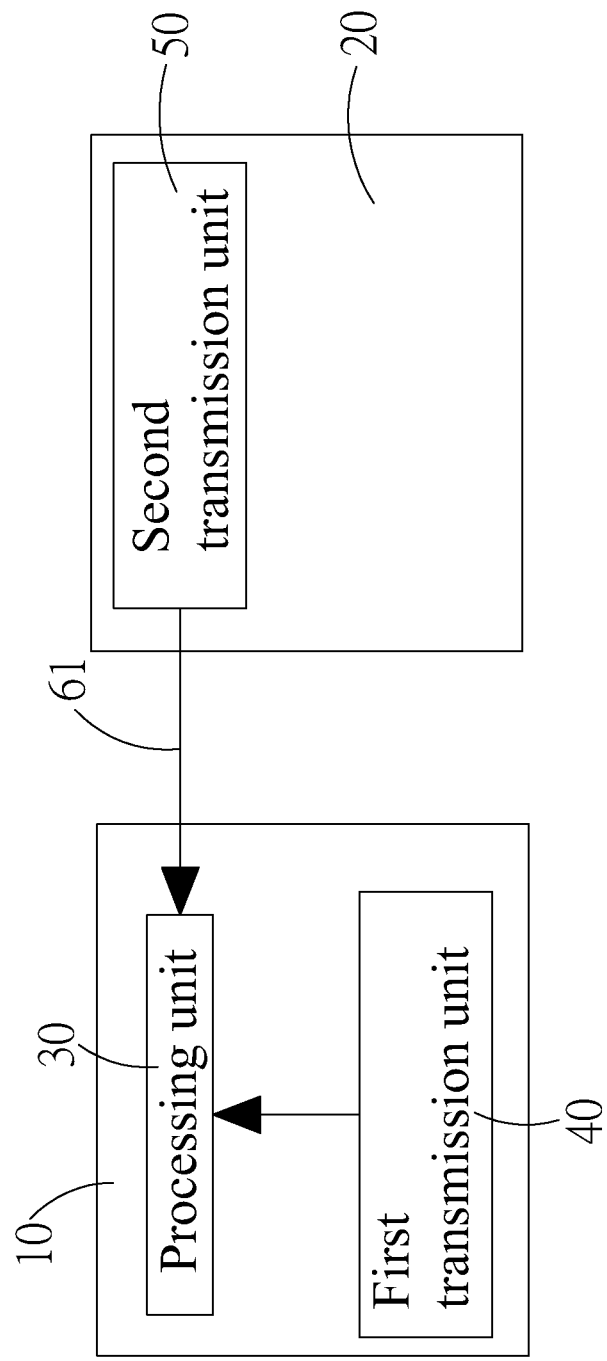
FIG. 2 is a schematic block diagram of a shortwave communication device of the present invention.

With reference to FIGS. 1 and 2 for a perspective view and a schematic block diagram of a shortwave communication device of the present invention respectively, the shortwave communication device 1 comprises a first carrier 10, a second carrier 20, a processing unit 30, a first transmission unit 40, a second transmission unit 50 and a flexible connecting portion 60.

The processing unit 30 and the first transmission unit 40 are installed on first carrier 10; the first transmission unit 40 is coupled to the processing unit 30; the processing unit 30 is a non-contact sensor chip; the second transmission unit 50 is installed on the second carrier 20; the first transmission unit has a first antenna coil; and the second transmission unit 50 has a second antenna coil.

The flexible connecting portion 60 is coupled between the first and second carriers 10, 20, and the flexible connecting portion 60 has a connected line 61 for constituting an electric connection between the processing unit 30 and the second transmission unit 50, wherein the flexible connecting portion 60 is a flexible flat cable.

Figure 3:
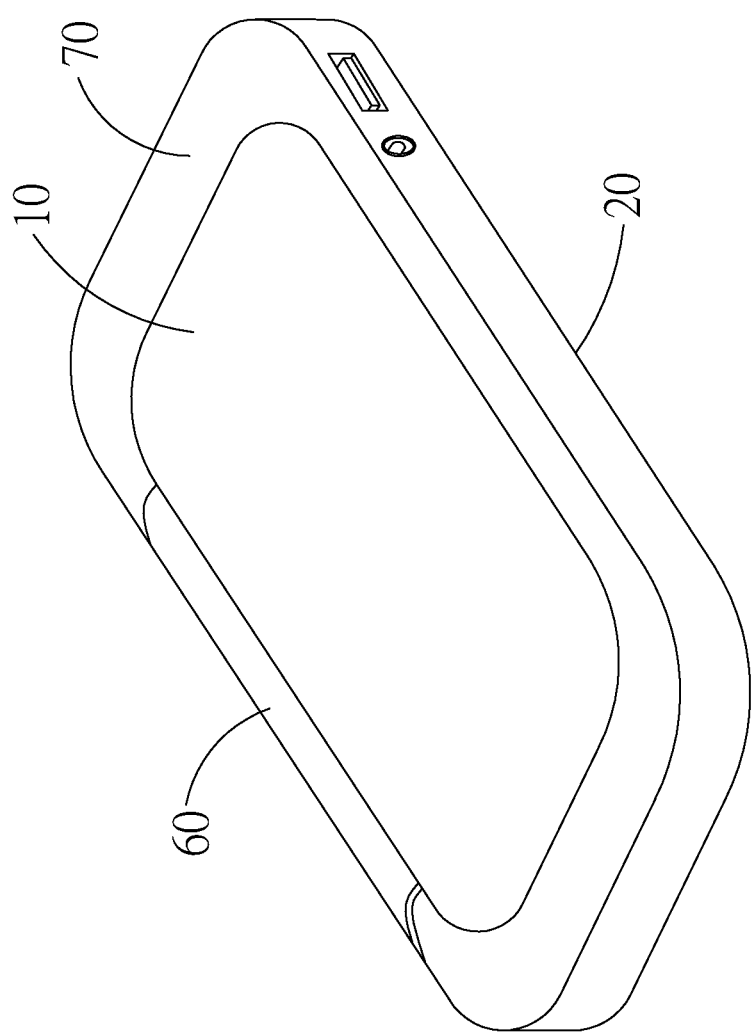
FIG. 3 is a perspective view of an application of a shortwave communication device of the present invention.
Figure 4:
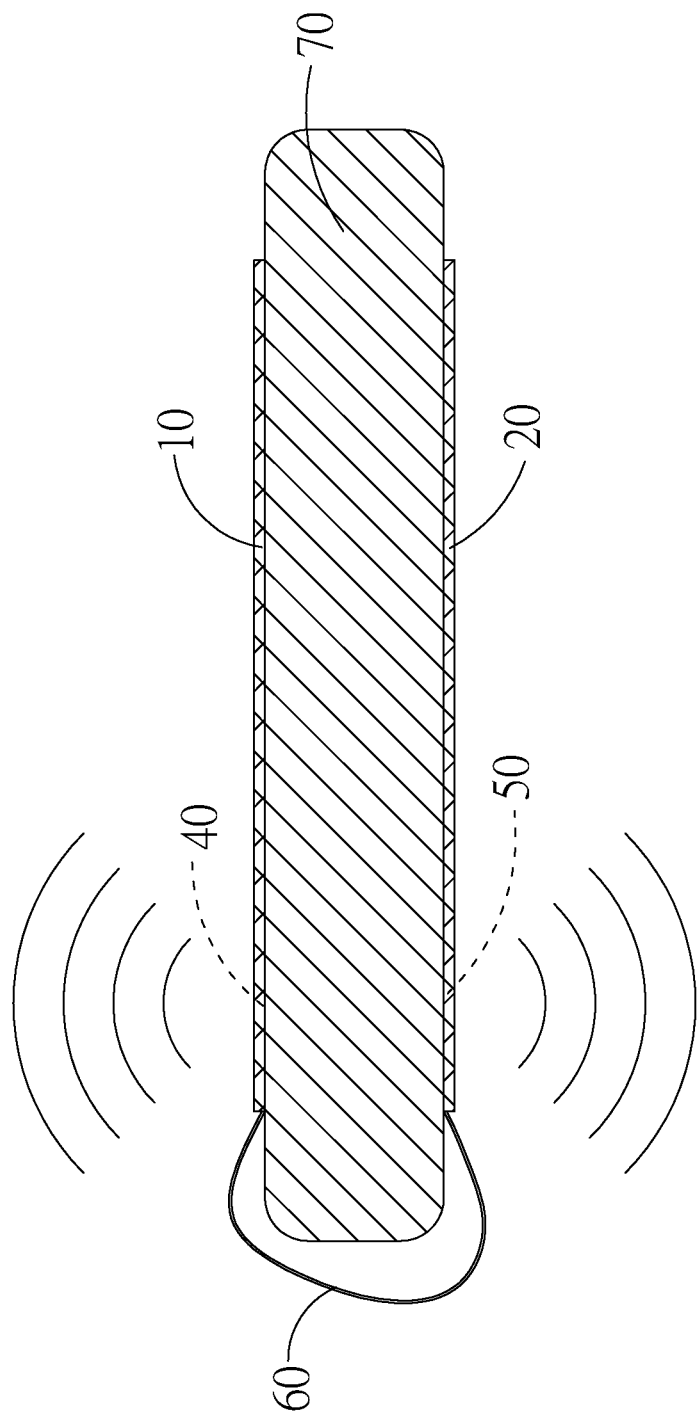
FIG. 4 is a schematic view of an application of a touch pen in accordance with the first preferred embodiment of the present invention.

When use, the flexible connecting portion 60 can be used for changing the relative positions of the first and second carriers 10, 20 freely as shown in FIGS. 3 and 4, and the first and second carriers 10, 20 are arranged with an interval apart from each other, and an electronic appliance 70 can be disposed between the first and second carriers 10, 20, and the flexible connecting portion 60 is provided for situating the first carrier 10 on a surface of the electronic appliance 70, and the second carrier 20 on the other opposite surface of the electronic appliance 70. When a user uses the shortwave communication device 1 for e-Commerce, the first and second transmission units 40, 50 disposed on both surfaces of the electronic appliance 70 respectively can be used to expand the transmission range to both sides of the electronic appliance 70 without creating a shielding effect to the electronic appliance 70 or affecting the transmission effect. Of course, the aforementioned electronic appliance can be a mobile power supply or a portable electronic device.

Figure 5:
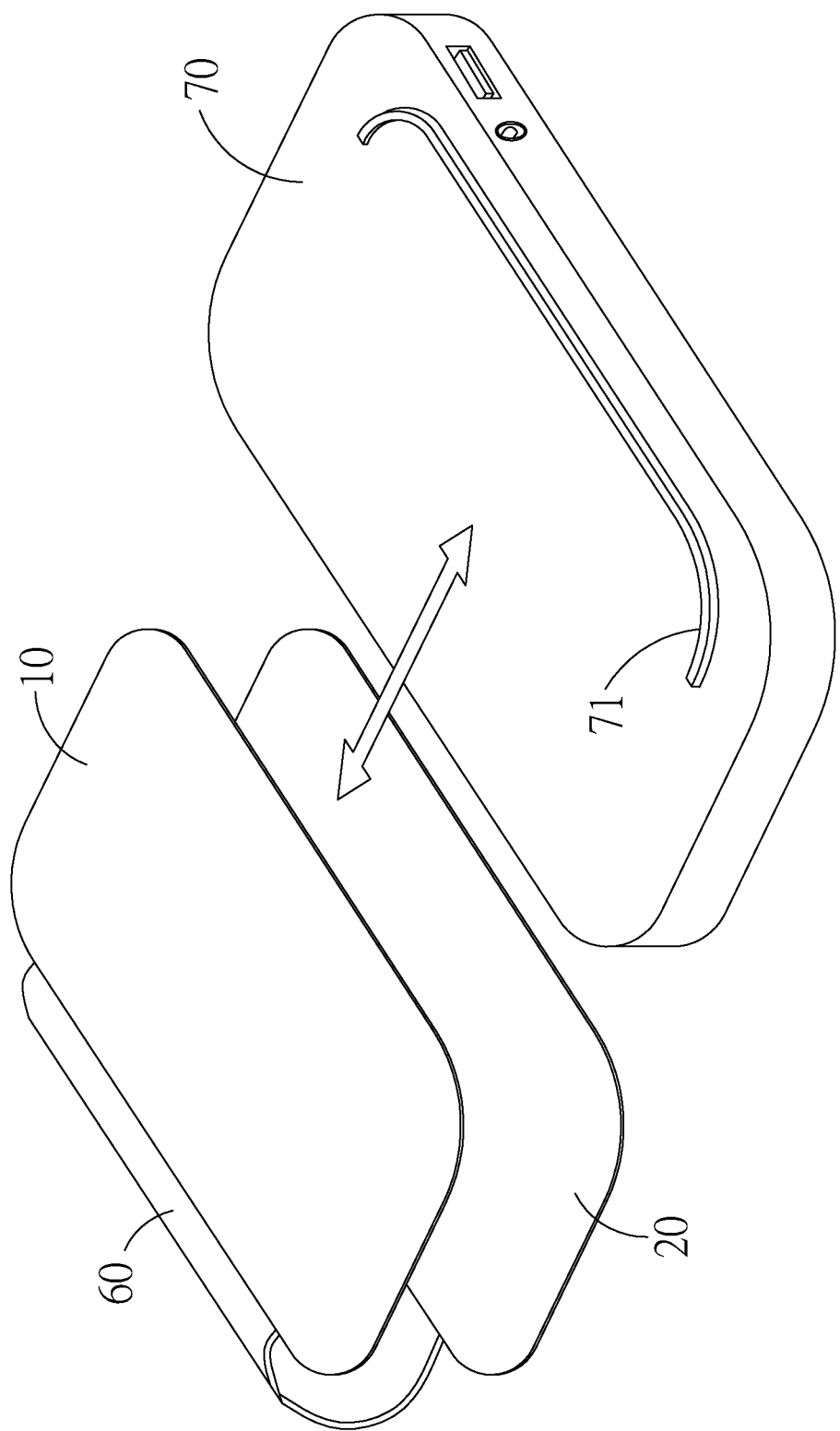
FIG. 5 is an exploded view of a shortwave communication device and an electronic appliance of the present invention.
Figure 6:
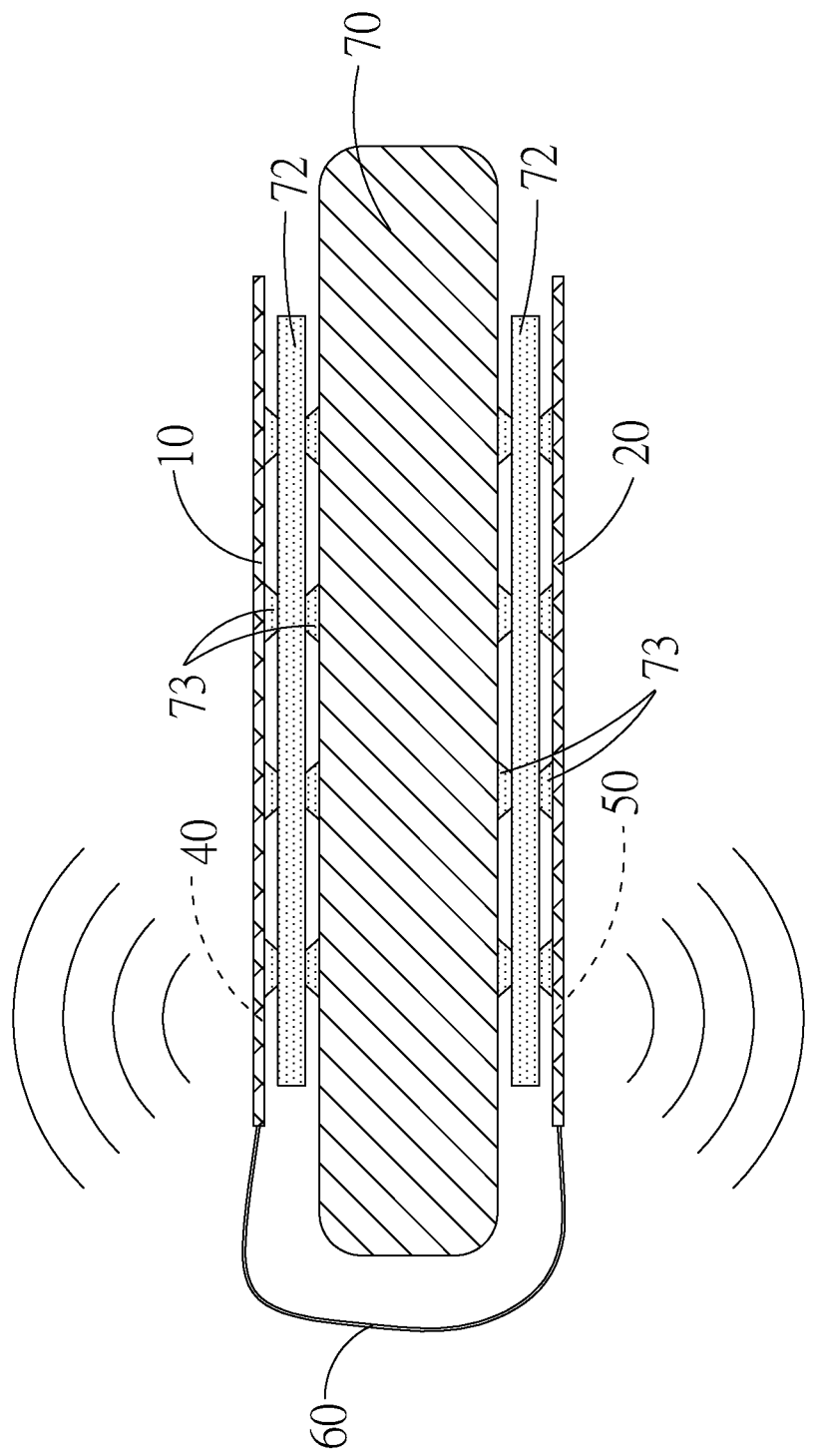
FIG. 6 is another schematic view of a shortwave communication device and an electronic appliance of the present invention.

Further, a positioning structure can be installed between the electronic appliance and the first and second carriers in accordance with a preferred embodiment as shown in FIG. 5, and the positioning structure can be a slot 71 formed on a surface of the electronic appliance 70 and provided for inserting and positioning the first and second carriers 10, 20; or the positioning structure can be an attaching unit in accordance with another preferred embodiment as shown in FIG. 6, wherein the attaching unit comprises a main body 72 and an attaching portion 73 disposed separately on both opposite surfaces of the main body 72, and each attaching portion 73 is provided for attaching and positioning onto surfaces of the electronic appliance 70 and first and second carriers 10, 20, so as to achieve the fixing effect.

Figure 7:
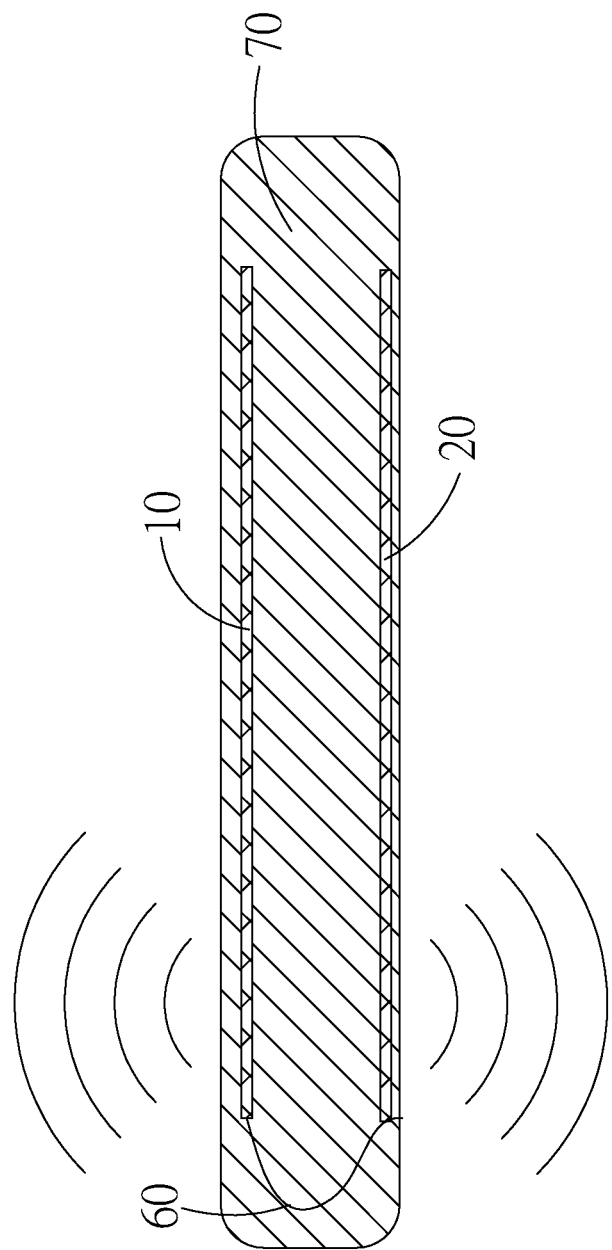
FIG. 7 is a further schematic view of a shortwave communication device and an electronic appliance of the present invention.

In addition, the shortwave communication device 1 can be installed in the electronic appliance 70 as shown in FIG. 7. Similarly, the flexible connecting portion 60 can be used for changing the relative positions of the first and second carriers 10, 20, so that the first and second carriers 10, 20 can be disposed on opposite upper and lower sides in the electronic appliance 70 respectively.

In summation of the description above, the present invention improves over the prior art and complies with the patent application requirements, and thus is duly filed for patent application. It is noteworthy that while the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A shortwave communication device, comprising:
    a first carrier;
    a second carrier separate from the first carrier;
    a processing unit, installed on the first carrier;
    a first transmission unit, installed on the first carrier, and coupled to the processing unit, the first transmission unit having a first antenna coil for wireless communications;
    a second transmission unit, installed on the second carrier, the second transmission unit having a second antenna coil for wireless communications; and
    a flexible connecting portion, coupled between the first carrier and the second carrier, and the flexible connecting portion being a flexible flat cable and having a connected line for constituting an electric connection between the processing unit and the second transmission unit;
    whereby the first and second carriers are adapted to accommodate therebetween an electronic appliance having two opposite outer surfaces such that the first carrier is disposed onto one of the two opposite outer surfaces of the electronic appliance and the second carrier is disposed onto the other one of the two opposite outer surfaces of the electronic appliance.

2. The shortwave communication device of claim 1, wherein the electronic appliance is a mobile power supply or a portable electronic device.

3. The shortwave communication device of claim 1, further comprising a positioning structure installed between the electronic appliance and the first and second carriers.

4. The shortwave communication device of claim 3, wherein the positioning structure is a slot formed on a surface of the electronic appliance.

5. The shortwave communication device of claim 3, wherein the positioning structure is an attaching unit comprising a main body and an attaching portion disposed separately on both opposite surfaces of the main body.

6. The shortwave communication device as recited in claim 1, wherein the processing unit is a non-contact sensor chip for shortwave communication.

7. A shortwave communication device, installed in an electronic appliance, comprising:
    a first carrier;
    a second carrier separate from the first carrier;
    a processing unit, installed on the first carrier;
    a first transmission unit, installed on the first carrier, and coupled to the processing unit, the first transmission unit having a first antenna coil for wireless communications;
    a second transmission unit, installed on the second carrier, the second transmission unit having a second antenna coil for wireless communications; and
    a flexible connecting portion, coupled between the first carrier and the second carrier, and the flexible connecting portion being a flexible flat cable and having a connected line for constituting an electric connection between the processing unit and the second transmission unit;
    wherein the electronic appliance has two opposite outer surfaces and the first and second carriers are installed within the electronic appliance, so that the first carrier is disposed in proximity to one of the two opposite outer surfaces of the electronic appliance and the second carrier is disposed in proximity to the other one of the two opposite outer surfaces of the electronic appliance.

8. The shortwave communication device of claim 7, wherein the electronic appliance is a mobile power supply or a portable electronic device.

9. The shortwave communication device as recited in claim 7, wherein the processing unit is a non-contact sensor chip for shortwave communication.

* * * * *